United States Patent
Monajemi et al.

(10) Patent No.: US 10,257,742 B2
(45) Date of Patent: Apr. 9, 2019

(54) SPOOFING A SERVICE IDENTIFIER WHEN PERFORMING STATEFULL SWITCHOVER OF WIRELESS STATIONS

(71) Applicant: Cisco Technology, Inc., San Jose, CA (US)

(72) Inventors: Pooya Monajemi, Redwood City, CA (US); Vishal S. Desai, San Jose, CA (US); Young Il Choi, San Jose, CA (US); Tak Ming F. Pang, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 2 days.

(21) Appl. No.: 15/479,912

(22) Filed: Apr. 5, 2017

(65) Prior Publication Data

US 2018/0295538 A1 Oct. 11, 2018

(51) Int. Cl.
| | |
|---|---|
| *H04W 28/02* | (2009.01) |
| *H04W 4/21* | (2018.01) |
| *H04W 72/04* | (2009.01) |
| *H04W 36/06* | (2009.01) |
| *H04W 36/22* | (2009.01) |
| *H04L 29/12* | (2006.01) |

(Continued)

(52) U.S. Cl.
CPC ..... *H04W 28/0252* (2013.01); *H04L 61/1541* (2013.01); *H04W 4/21* (2018.02); *H04W 36/06* (2013.01); *H04W 36/22* (2013.01); *H04W 52/265* (2013.01); *H04W 72/0453* (2013.01); *H04W 72/0486* (2013.01); *H04W 84/12* (2013.01)

(58) Field of Classification Search
CPC ............... H04W 28/0252; H04W 4/21; H04W 72/0486; H04W 72/0453; H04W 36/06; H04W 36/22; H04W 52/265; H04W 84/12; H04L 61/1541
See application file for complete search history.

(56) References Cited

U.S. PATENT DOCUMENTS

| | | | |
|---|---|---|---|
| 2012/0224659 A1* | 9/2012 | Yu | ......................... H04L 5/0048 375/340 |
| 2014/0016568 A1 | 1/2014 | Koskela et al. | |
| 2017/0026845 A1 | 1/2017 | Garg et al. | |

FOREIGN PATENT DOCUMENTS

| | | |
|---|---|---|
| EP | 2638656 BI | 12/2016 |
| WO | 2003/005643 A1 | 1/2003 |

* cited by examiner

*Primary Examiner* — Omar J Ghowrwal
(74) *Attorney, Agent, or Firm* — Patterson + Sheridan, LLP (57) ABSTRACT

Embodiments herein describe control logic for seamlessly switching client devices between radios co-located on the same network device or between radios located on different network devices that have overlapping coverage areas. In one embodiment, the radios are assigned different channels in the same frequency band. To move the client devices between the radios, one of the radios transmits a Channel Switch Announcement (CSA) which instructs the client devices serviced by a first radio to switch to a channel assigned to a second, different radio. For example, the CSA may be used when the first radio fails, is upgraded, performs a Channel Availability Check (CAC), is overloaded, and the like. After the CSA is transmitted, the second radio spoofs the service identifier of the first radio so to the perspective of the client devices, they are still communicating with the first radio.

17 Claims, 7 Drawing Sheets

(51) Int. Cl.
*H04W 52/26* (2009.01)
*H04W 84/12* (2009.01)

SPOOFING A SERVICE IDENTIFIER WHEN PERFORMING STATEFULL SWITCHOVER OF WIRELESS STATIONS

TECHNICAL FIELD

Embodiments presented in this disclosure generally relate to moving client devices between radios, and more specifically, to using a Channel Switch Announcement (CSA) to seamlessly move client devices between radios.

BACKGROUND

Current wireless access points (APs) allow for simultaneous operation of multiple radios in different bands (e.g., one in the 2.4 GHz band and one in the 5 GHz band). With the additional spectrum available in 5 GHz and the increasing bandwidth use of Wi-Fi® based signals (up to 160 MHz bandwidth), many AP manufacturers want to add more 5 GHz radios into an AP. The APs, however, may lack means for pushing client devices between the radios. For example, if one radio goes down, the AP does not have means for seamlessly moving client devices (i.e., with little or no noticeable effect on traffic flow) to the other radio.

Moreover, a plurality of APs may be deployed using a unified model that includes a wireless local area network (WLAN) controller. The WLAN controller can communicate with each of the plurality of APs to receive performance metrics such as the load on each of the APs, adjust settings in the APs, and the like. However, like an AP with multiple radios, the WLAN controller is not able to seamlessly move client devices between the APs. For example, if one radio goes down unexpectedly or due to an upgrade, the network service to the client devices connected to the unavailable AP may be interrupted before the client devices roam to a different AP (assuming the APs have overlapping coverage areas).

SUMMARY

One embodiment of the present disclosure is a communication system that includes a first radio configured to service a first plurality of client devices using a first channel and a second radio configured to service a second plurality of client devices using a second channel. The network includes control logic configured to control the first and second radios where the control logic is configured instruct one of the first radio and the second radio to transmit a CSA to at least a first client device of the first plurality of client devices using the first channel where the CSA comprises instructions to switch from the first channel to the second channel. The control logic is configured to instruct the second radio to spoof a first service identifier corresponding to the first radio such that the first client device switches to the second channel and is serviced by the second radio, and where, in parallel to spoofing the first service identifier, the second radio advertises a second service identifier corresponding to the second radio. The second service identifier is used to establish communication between the second plurality of client devices and the second radio.

Another embodiment described herein is a computing system for controlling a first radio using a first channel to communicate with a first plurality of client devices and a second radio using a second channel to communicate with a second plurality of client devices. The computing system includes a processor and memory configured to store a program that performs an operation for controlling the first and second radios. The operation includes instructing one of the first radio and the second radio to transmit a CSA to at least a first client device of the first plurality of client devices using the first channel where the CSA comprises instructions to switch from the first channel to the second channel and instructing the second radio to spoof a first service identifier corresponding to the first radio such that the first client device switches to the second channel and is serviced by the second radio, and where, in parallel to spoofing the first service identifier, the second radio advertises a second service identifier corresponding to the second radio, and the second service identifier is used to establish communication between the second plurality of client devices and the second radio.

Another embodiment described herein is a method of controlling a first radio using a first channel to communicate with a first plurality of client devices and a second radio using a second channel to communicate with a second plurality of client devices. The method includes instructing one of the first radio and the second radio to transmit a CSA to at least a first client device of the first plurality of client devices using the first channel where the CSA comprises instructions to switch from the first channel to the second channel and instructing the second radio to spoof a first service identifier corresponding to the first radio such that the first client device switches to the second channel and is serviced by the second radio, and wherein, in parallel to spoofing the first service identifier, the second radio advertises a second service identifier corresponding to the second radio, and the second service identifier is used to establish communication between the second plurality of client devices and the second radio.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Embodiments herein describe control logic for seamlessly switching client devices between radios co-located on the same AP or between radios located on different APs that have overlapping coverage areas. Seamlessly switching the client devices means that the data flow to or from the client device is not interrupted such that a user can detect the client device has switched between radios. Put differently, although the client device may temporarily not have a network connection when switching radios, this switch may not have an impact on the device that is noticeable to the user (e.g., a stream video or music stops or an application that requires a network connection stops functioning).

In one embodiment, the radios use the same frequency band (e.g., 2.4 GHz or 5 GHz) but are assigned different channels on that band. To move the client devices between the radios, one of the radios transmits a Channel Switch Announcement (CSA) which instructs the client devices serviced by the radio to switch to the channel advertised in the CSA. Typically, a CSA is used by a network device (e.g., an AP or station) to inform the client devices serviced by that network device that the network device is moving to a new channel. However, in the embodiments herein, the CSA is used to switch some or all of the client devices serviced by a first radio to a channel assigned to a second, different radio. For example, the CSA may be used when the first radio fails, is upgraded, performs a Channel Availability Check (CAC), is overloaded, and the like. After transmitting the CSA, the second radio spoofs the service identifier of the first radio (e.g., a basic service set identifier (BSSID)) so to the perspective of the client devices, they are still communicating with the first radio.

Further, the CSA can be broadcasted to all the client devices of a particular radio, multicasted to only a subset of the client devices of a particular radio, or directed to a selected one of the client devices. For example, if the first radio fails, a second radio may broadcast a CSA to all of the client devices serviced by the first radio (using the channel assigned to the first radio) so that all of the client devices are seamlessly transferred to the channel used by the second radio. When performing load balancing, a transmission power level of the of the CSA can be reduced so that only a subset of the client devices serviced by the first radio (e.g., 30%) receive the CSA, and thus, switch to the channel serviced by the second radio. Further, the CSA (which is intended in IEEE 802.11 to be a broadcast frame) can be converted into a unicast frame which is received by only one target client device. Thus, using a unicast CSA frame, only the target client device can be moved from one radio to another.

Figure 1:
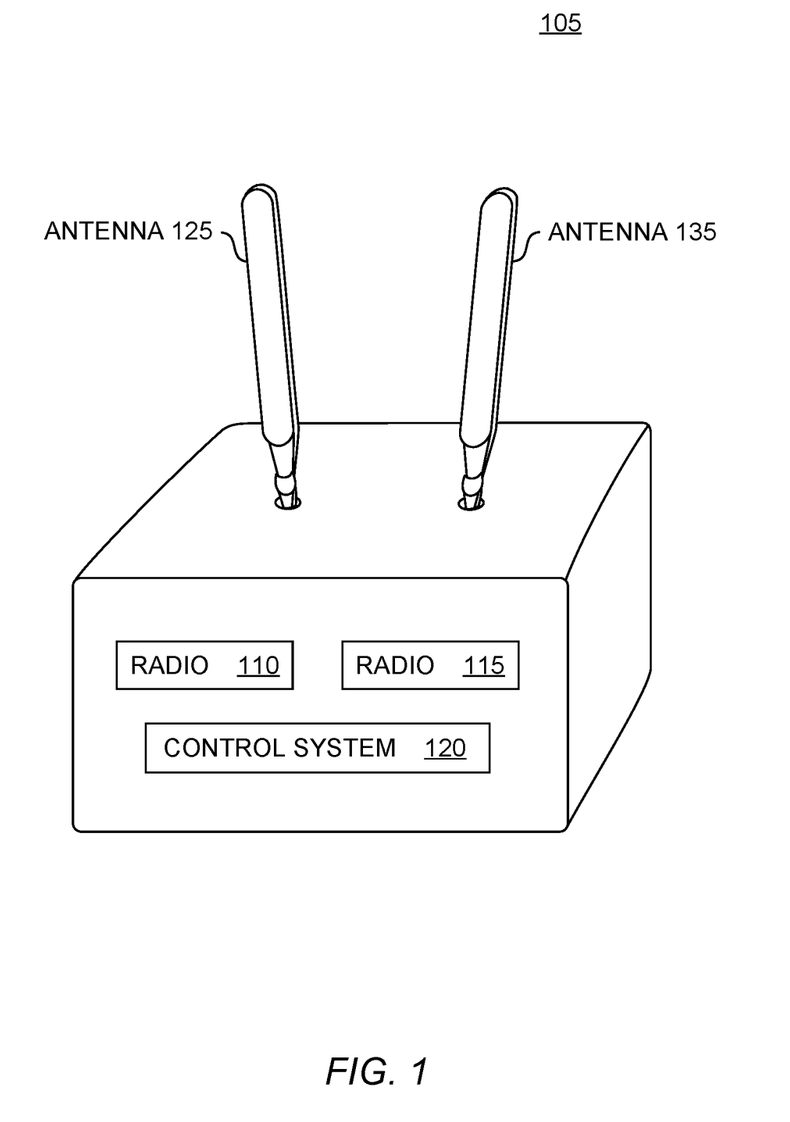
FIG. 1 illustrates a diagrammatic view of a wireless AP according to an embodiment described herein.

FIG. 1 illustrates a dual wireless AP 105 (e.g. a dual radio AP) that can be used in a communication system. The AP 105 has a body which includes a first radio 110 coupled to a first antenna 125 to establish a first cell. The body of the dual AP 105 also includes a second radio 115 coupled to a second antenna 135 to form a second cell independent of the first cell. In one embodiment, one of the cells is a macro cell while the other is a micro cell which has a smaller coverage area than the macro cell. For example, the first radio 110 (e.g., a macro radio) and the first antenna 125 establish the macro cell while the second radio 115 (e.g., a micro radio) and second antenna 135 establish a micro cell. In some implementations, the first radio 110 and second radio 115 include respective transceivers.

Although shown as single antennas, the first antenna 125 and second antenna 135 can represent a plurality of antennas coupled to the respective radios of the dual AP 105. In some embodiments, the plurality of antennas coupled to the first radio 110 includes the same type of antennas as the plurality of antennas coupled to the second antenna 135 (e.g., dipole antenna, half-wave dipole antenna, monopole antenna, loop antenna, etc.). However, in other embodiments, first and second radios 110, 115 are coupled to different types of antennas. For example, the first antenna 125 may be a vertically polarized antenna while the second antenna 135 is a horizontally polarized antenna.

The AP 105 includes a control system 120 used to perform the functions described herein. The control system 120 (or control logic) includes various hardware (e.g., processor and memory), firmware, and software components used to control the AP 105. In some implementations, the control system 120 facilitates traffic bearing communications between the AP 105 and one or more client devices. In one embodiment, the control system 120 causes the AP 105 to operate the first and second radios 110, 115 such that the first and second antennas 125 and 135 operate in a same frequency band (e.g., the 5 GHz band according to IEEE 802.11n, IEEE 802.11ac, or the like). Although CSA is currently defined in the IEEE 802.11 for applying between channels in the 5 GHz band, in future standards CSAs may apply to other frequency bands and communication techniques. In that case, the embodiments herein can be used if the first and second radios 110, 115 operate on different frequency bands. For example, the first radio 110 may be controlled to operate on 5 GHz and second radio 115 operates on 2.4 GHz. As another example, the first radio 110 may be controlled to operate on 5 GHz and second radio 115 may be controlled to operate on 802.11ad. In one embodiment, the first radio 110 may be controlled to operate on 2.4 GHz and the second radio 115 may be controlled to operate on BLUETOOTH. In some implementations, the different frequency bands may be a combination of WiFi, BLUETOOTH, 5 GHz, 2.4 GHz, LTE, 3G, etc. In one embodiment, one or both of the first and second radio 110, 115 can dynamically switch between different frequency bands. In another embodiment, the first radio 110 can be dynamically switched between different frequency bands (e.g., between 5 GHz and 2.4 GHz) while the second radio 115 is a dedicated radio (e.g., only uses 5 GHz).

In one embodiment, the control system 120 operates the first radio 110 according to a first power level and the second radio 115 according to a second power level such that the coverage area of the macro cell is larger than the coverage area of the micro cell. But in other embodiments, the coverage areas of the first and second radios are the same. Although, the control system 120 is illustrated as residing on a single device (i.e., the AP 105), it should be understood that in other implementations the control system 120 may reside in a separate computing device.

Figure 2:
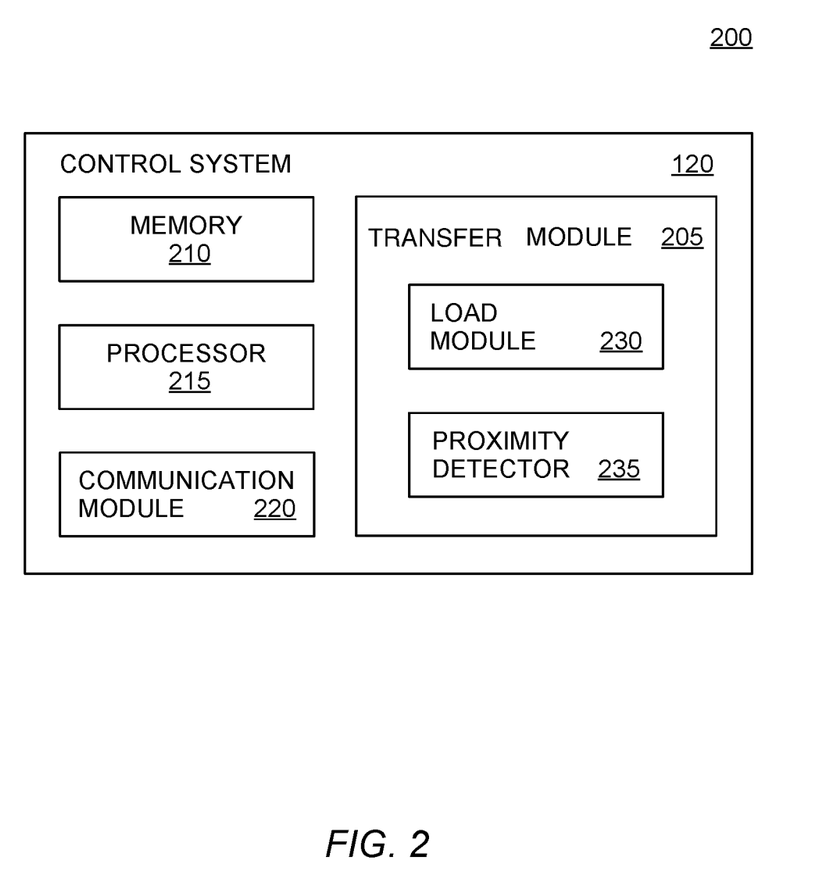
FIG. 2 illustrates a control system for operating a wireless AP according to an embodiment described herein.

FIG. 2 illustrates a block diagram of the control system 120 for operating the AP 105, according to an embodiment described in the present disclosure. For example, in some implementations, the control system 120 controls an AP, router, switch, or the like. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, the control system 120 includes transfer module 205, memory 210, one or processors 215, and communication module 220.

The memory 210 may include volatile memory, non-volatile memory, or combinations thereof. The memory 210 may optionally include one or more storage devices remotely located from the network device. The processor 215 represents one or more processing elements that each may include one or more processing cores. The communication module 220 may include one or more communication buses for interconnecting these and various other components.

The transfer module 205 includes a load balance module 230 and proximity detector 235 which may include hardware components, software components, or combinations thereof. The load balance module 230 determines the number of client devices on each cell, i.e., the macro and micro cell. In one embodiment, the load balance module 230 determines how to distribute the client device population for optimal time sharing of the radios. The load balance module 230 may make the determination based on a number of associated devices to each of the micro and macro cell, or based on per client utilization of the cells (e.g., uploading by the client device or downloading by the client device).

Proximity detector 235 determines where a client device is located relative to the AP 105. The proximity detector 235 may track the location of a client device once the device has associated with the macro or micro cell. By tracking the location of the client device, the transfer module 205 can determine to transfer a client device from the macro cell to the micro cell when, for example, the macro cell is overloaded or the macro cell will be unavailable to perform a software upgrade. As described in more detail below, the control system 120 can use the transfer module 205 to determine when to send a CSA to transfer client devices serviced by one of the radios in the AP to another radio in the AP.

Figure 3:
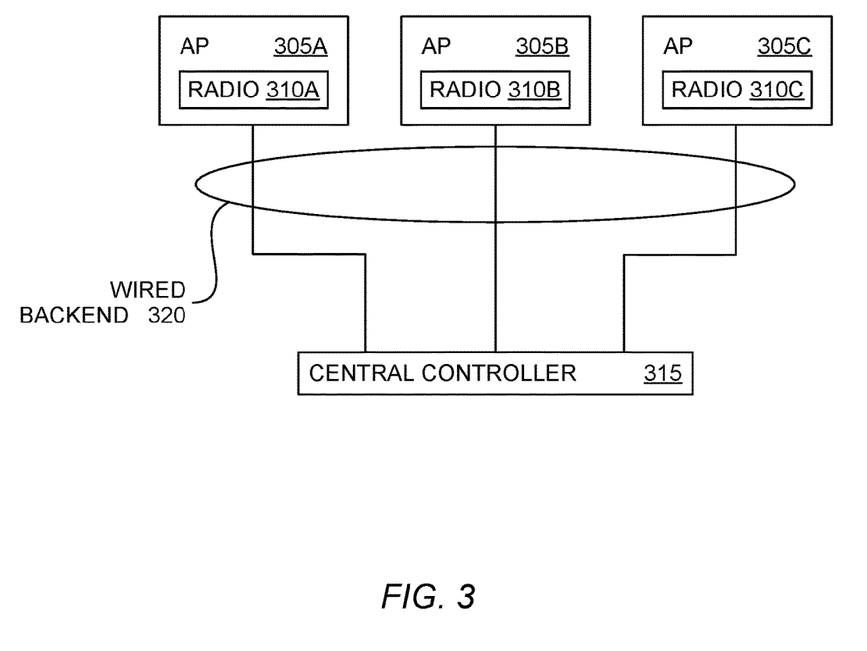
FIG. 3 illustrates a central controller coupled to multiple APs, according to an embodiment described herein.

FIG. 3 illustrates a central controller 315 coupled to multiple APs 305 in a communication system, according to an embodiment described herein. The APs 305 each includes a radio 310; however, in other embodiments the APs 305 may include multiple radios configured as described above in FIGS. 1 and 2. The APs 305 are communicatively coupled to the central controller using a wired backend 320. The APs 305 may transmit various control information to the central controller 315 such as the number of client devices coupled to each AP, the location of the client devices relative to the APs, and the like.

The central controller 315 can use the information provided by the APs 305 to determine whether to transfer client devices serviced by the radio 310 in one of the APs 305 to a radio 310 of a neighboring AP 305 (assuming the coverage areas of the two radios at least partially overlap). That is, unlike in FIG. 2, here the central controller 315 has control logic for determining when to switch client devices between radios on separate APs 305. To do so, the central controller 315 may have similar applications such as the load balancing module 230 and proximity detector 235 described above which consider the load between the APs 305 as well as the location or RF location about the client devices relative to the APs 305.

The central controller 315 may be a standalone computing device—e.g., a server—separate from the APs 305. In another embodiment, the central controller 315 may be part of one of the APs 305. For example, the AP 305A may be a master AP which contains the central controller 315 for instructing the APs 305 when to use a CSA to move client devices between the radios 310. In either case, the central controller 315 can include various hardware (e.g., processor and memory), firmware, and software components used to control the APs 305.

Figure 4:
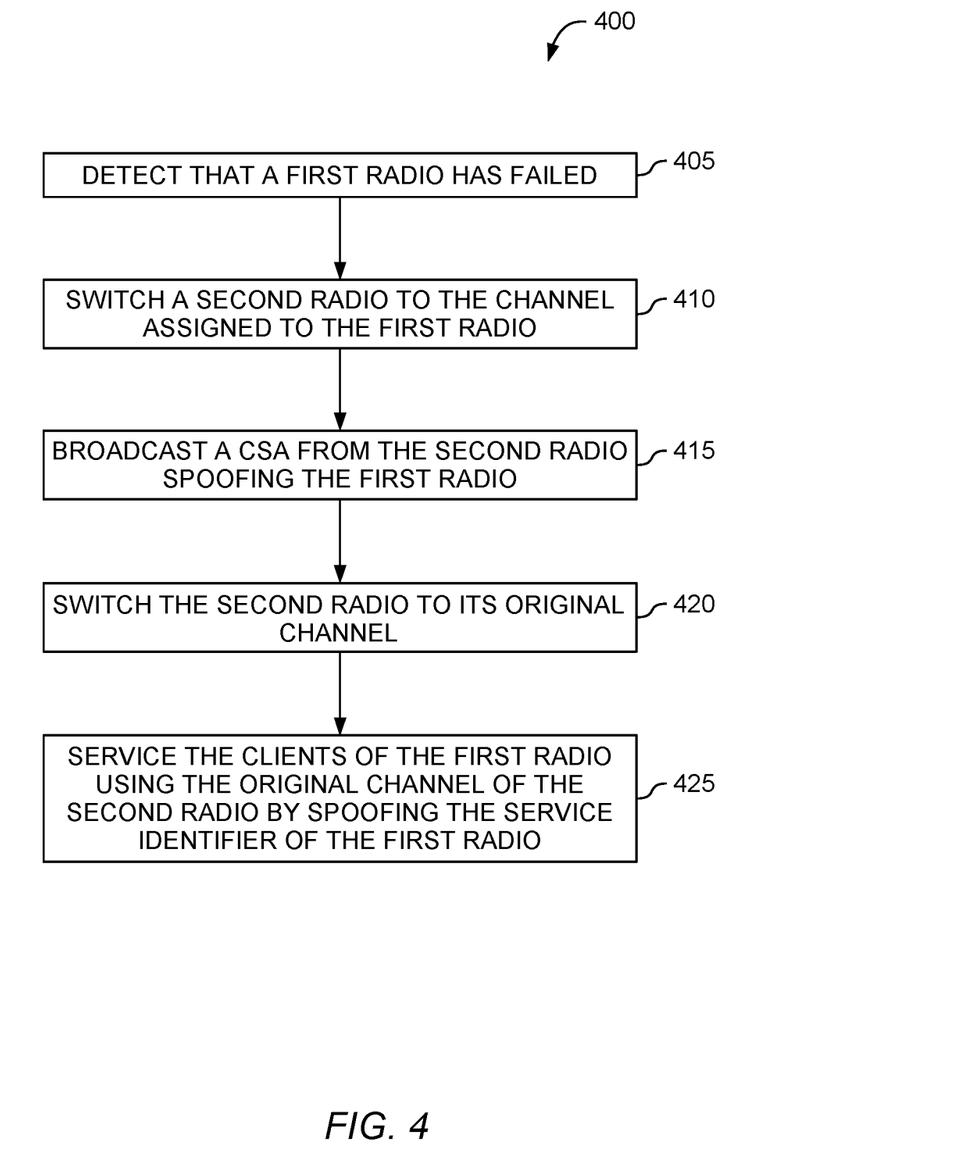
FIG. 4 is a flowchart for broadcasting a CSA to switch client devices between radios, according to an embodiment described herein.

FIG. 4 is a flowchart of a method 400 for broadcasting a CSA to switch clients between radios, according to an embodiment described herein. At block 405, control logic in the control system or in the central controller detects that a first radio has failed. Referring to FIG. 1, the control system 120 may determine that the first radio 110 in the AP 105 has failed but the second radio 115 is still operational. Referring to FIG. 3, the central controller 315 may determine that the radio 310A in the AP 305A has failed. In either case, the method 400 can be used to transmit a CSA to seamlessly move all the client devices previously using the failed radio to a different radio in the same AP (in the case of FIG. 1) or to a radio (or multiple radios) disposed on a different AP (in the case of FIG. 3).

At block 410, a second radio switches to the channel assigned to the first radio (which is no longer serving clients). For example, both the first and second radios may transmit in the 5 GHz frequency band but may be assigned different channels—e.g., the first radio communicates using Channel X while the second radio uses Channel Y. Upon detecting the first radio has failed, the control logic temporarily switches the second radio from Channel Y to Channel X.

At block 415, the second radio broadcasts a CSA to all the client devices serviced by the first radio by spoofing the first radio. That is, the second radio may advertise itself as the first radio (e.g., transmit the same BSSID as the first radio) so that the control logic in the client devices interpret the CSA as originating from the first radio. Moreover, the CSA instructs the client devices to switch to the original channel assigned to the second radio (before the second radio temporarily switched over to the channel of the first radio—e.g., Channel Y). In response, the client devices begin to switch from the current channel and attempt to communicate with the first radio on the channel advertised in the CSA.

In one embodiment, if the first and second radios are co-located on the same AP, the second radio broadcasts the CSA using a transmission power level that matches the power level used by the first radio so that the CSA reaches all the clients that are serviced by the first radio. For example, if the second radio is used to establish the micro cell which is smaller than the macro cell, at block 415, the second radio may increase its transmission power so that the spoofed CSA reaches all the client devices that have been communicating with the first radio—i.e., the macro cell. The second radio may continue to use the increased power level to ensure the second radio can continue to communicate with the client devices after the client devices have switched to the channel advertised in the CSA (i.e., the channel originally assigned to the second radio).

In one embodiment, a central controller instructs multiple radios on different APs to transmit respective CSAs. For example, the second radio may be disposed on one side of the first radio and is not capable of broadcasting the CSA such that it can be detected across the entire coverage area of the first radio. Thus, the central controller may instruct a third radio (or any number of additional radios) disposed in an AP on the other side of the AP containing the first radio to transmit a CSA spoofing the first radio. For example, the central controller may instruct the second radio to transmit a spoofed CSA to advertise its channel, and then later, after the client devices that received the CSA from the second radio have begun switching their channel, the central controller instructs the third radio to send out a CSA advertising its channel to switch over any remaining client devices that were serviced by the first radio to the third radio.

At block 420, the second radio (and any other radios that may have transmitted a spoofed CSA) switches back to its original channel. That is, the second radio switches back to the channel it used prior to block 410.

At block 425, the second radio services the client devices of the first radio using its originally assigned channel by spoofing the service identifier of the first radio. That is, when the client devices migrate to the channel used by the second radio, these client devices expect to continue to communicate with the first radio. Thus, the second radio spoofs the service identifier of the first radio (e.g., it's BSSID) so that the client devices will begin communicating with the second radio believing it to be the first radio. The BSSID of the first radio may be provided to the second radio by either the control system or the central controller. In another embodiment, the second radio may spoof the MAC address of the first radio.

In parallel to spoofing the service identifier of the first radio, the second radio also advertises its own service identifier (e.g., BSSID) so that second radio can continue to service any client devices that were communicating with it prior to the first radio failing. That is, at intervals, the second radio may advertise its BSSID as well as the BSSID of the first radio so that the second radio can service both the client devices connected to the second radio before the first radio failed, as well as the client devices previously communicating with the first radio. Although the second radio advertises both its BSSID as well as the spoofed BSSID of the first radio "in parallel", this does not necessarily mean the second radio advertises the BSSIDs at the same time but can advertise the BSSIDs using separate frames transmitted at different times. Nonetheless, the second radio actively advertises two BSSIDs.

Although performing method 400 may temporarily interrupt or delay traffic between the second radio and its client devices while the second radio switches to the channel of the first radio and transmits the spoofed CSA, this delay is minor but advantageously prevents major service delays for the client devices communicating with the first radio since these devices are seamlessly transferred to the second radio rather than having to determine that the first radio has failed and then roam to a different radio—a process which can take much longer.

In one embodiment, the control logic may determine the first radio has again become available—e.g., after a reboot. Because the second radio is servicing the combination of the client devices for the first radio and its own client devices, the control logic may move the clients that were originally associated to the first radio back to that radio. To do so, the control logic may instruct the second radio to transmit a CSA using the spoofed BSSID of the first radio which advertises the channel currently used by the first radio after the reboot. Thus, the client devices that think they are still communicating with the first radio receive the CSA and switch back to the channel assigned to the first radio. However, the client devices that are associated with the BSSID of the second radio will ignore the CSA and remain connected to the second radio. In this manner, the second radio can pass back the client devices assigned to the first radio once that radio is again available.

Although the method 400 was described as occurring after a failed radio, the embodiments are not limited to such. In another example, instead of an unexpected failure, the control logic in the control system or the central controller may be able to proactively determine when the first radio will be unavailable. For example, the first radio may become unavailable in order to perform a CAC before switching to a Dynamic Frequency Selection (DFS) channel in the 5 GHz band. During a CAC, the first radio monitors a channel for presence of radar prior to initiating a communication link in that channel. The client devices served by the first radio may be without service while the first radio performs the CAC which can last as long as a minute, or even more in other cases. Instead, the first radio can broadcast a CSA to its client devices instructing them to switch to the channel of the second radio (or any other radios). The second radio begins spoofing the BSSID of the first radio so that the client devices previously communicating with the first radio begin communicating with the second radio on its channel after receiving the CSA. In this example, either the first radio or the second radio can send out the CSA. It may be preferred to have the first radio proactively transmit the CSA to force its clients to the second radio so that the second radio does not need to switch channels in order to send out the CSA (which can have a slight negative impact on the client devices serviced by the second radio). Once the CAC is performed, the second radio can pass back the client devices to the new channel used by the first radio or the two radios can perform load balancing (as described below) to move some of the clients communicating with the second radio to the first radio. For example, the second radio can send out another CSA using the spoofed BSSID of the first radio announcing the now CAC cleared channel on which the first radio is operating. As a result, the client devices previously serviced by the first radio are again serviced by the first radio but on the DFS approved channel without any major disruptions in service.

In another example, a first radio may become unavailable when software associated with the radio is being upgraded. For example, if the first radio is co-located with a second radio on the same AP, the AP may be able to upgrade the first radio without affecting the second radio. In this case, the first radio may send out a CSA to move its client devices to the second radio and then the second radio can use a CSA to move the client devices back to the first radio or use load balancing to move some of the client devices to the first radio once the upgrade has completed.

Figure 5:
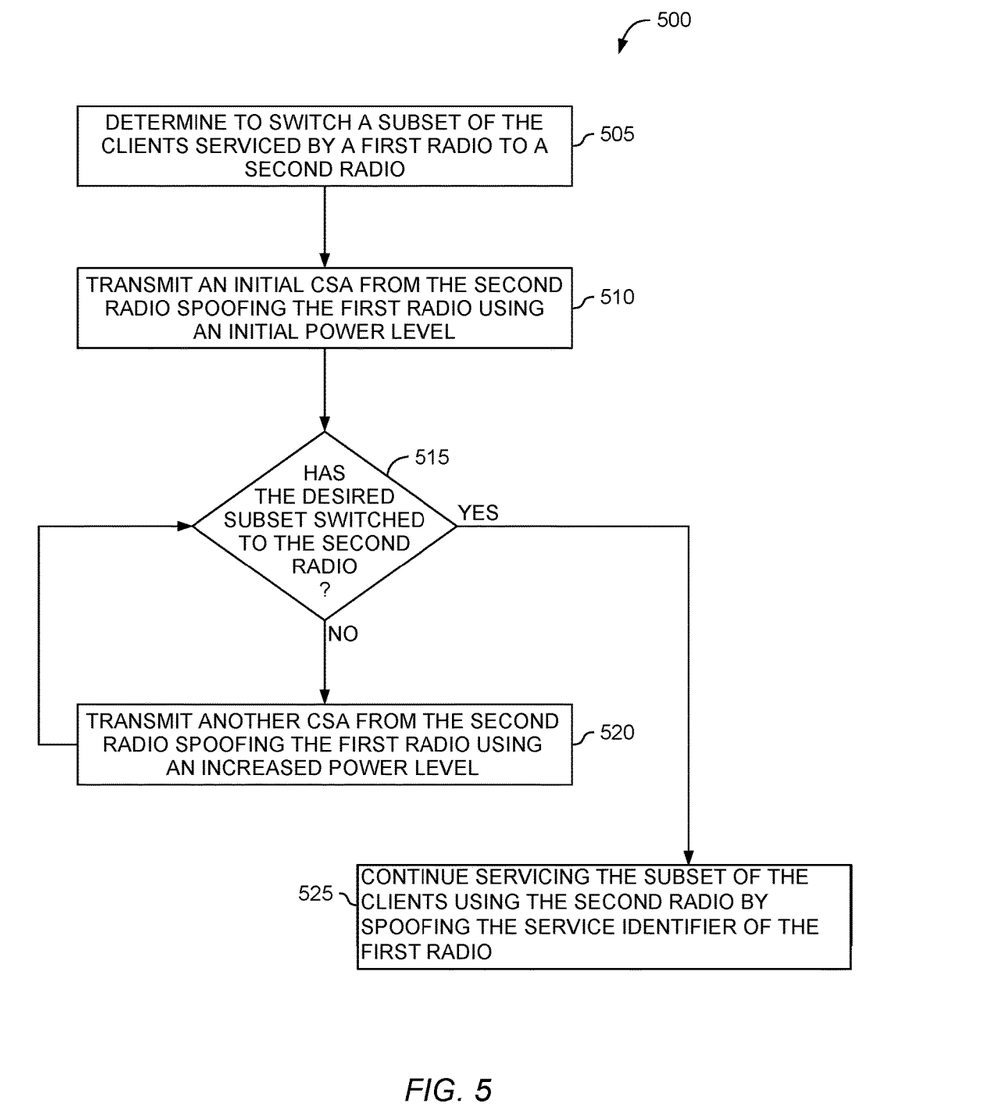
FIG. 5 is a flowchart for multicasting a CSA to switch client devices between radios, according to an embodiment described herein.

FIG. 5 is a flowchart of a method 500 for multicasting a CSA to switch client devices between radios, according to an embodiment described herein. At block 505, control logic in the control system or in the central controller determines to switch a subset of the client devices serviced by a first radio to a second radio. Thus, unlike in method 400 where all of the client devices for the first radio are moved to one or more different radios, in the method 500, the control logic may wish to leave at least one client device associated with the first radio. Referring to FIG. 1 as an example, the control system 120 may determine to move 10% of the client devices associated with the first radio 110 to the second radio 115 to perform load balancing. Referring to FIG. 3 as another example, the central controller 315 may determine to move 20% of the client devices serviced by the radio 310B in the AP 305B to the radio 310A in the AP 305A. In another example, the central controller 315 determines to move the subset of the client devices to multiple APs. For example, the central controller 315 may attempt to move 20% of the load on the radio 310B to the radios 310A and 310C on APs 305A and 305C. Regardless, the method 500 can be used to transmit a CSA to seamlessly move a subset of the client devices to a different radio in the same AP (in the case of FIG. 1) or to a radio (or multiple radios) disposed on a different AP (in the case of FIG. 3).

At block 510, the second radio transmits an initial CSA using an initial power level while spoofing the first radio. For example, the second radio may switch to the channel used by the first radio and transmit the CSA using the BSSID of the first radio. However, the second radio may not transmit the CSA at full power but rather at a reduced, initial power level. That way, the second radio ensures that the CSA does not extend through the entire coverage area of the first radio. The second radio may use a reduced, initial power level regardless whether the second radio is co-located with the first radio on the same AP or is disposed on a separate AP.

If the relative overlap of the coverage areas of the first and second radio is known, the control logic can tailor the initial power level of the CSA to cover a desired portion of the coverage area of the first radio. For example, if the control logic wants to move 20% of the load from the first radio to the second radio, the control logic may set the initial power level such that the CSA when transmitted from the second radio covers 20% of the coverage area of the first radio (assuming the client devices and the load are equally distributed in the coverage area). Of course, this determination is easier if the first and second radios are on the same AP since information regarding the clients associated to the first radio is readily available. In this manner, the control logic can transmit an initial CSA to attempt to move a desired subset of the client devices serviced by the first radio to the second radio.

At block 515, the control logic determines whether the desired subset of client devices has switched to the second radio. In one embodiment, the control logic counts the number of client devices that are now being serviced by the second radio after block 510 was performed. In other embodiment, the control logic may monitor the network traffic flowing in the first and second radios to see if the desired decrease in the network traffic (e.g., a desired decrease in the load) for the first radio has happened. In this example, the control logic may not know the exact number of client devices that have moved between the first and second radio but rather use the overall traffic flow or load to achieve load balancing.

If the desired subset of client devices have switched to the second radio, the method 500 proceeds to block 525 where the second radio continues to service the subset of the client devices that were moved in response to the CSA transmitted in block 510 by spoofing the service identifier of the first radio. However, if the desired subset of the client devices (or the amount of network traffic or the load) has not been switched to the second radio, method 500 proceeds to block 520 where the second radio transmits another spoofed CSA using an increased power level. By increasing the power level, the CSA extends through a greater portion of the coverage area of the first radio, and thus, increases the likelihood that the CSA is received by additional client devices currently communicating with the first radio. The control logic may increase the power level linearly each time blocks 515 and 520 are repeated or non-linearly (e.g., exponentially). However, once the desired subset of client devices or desired portion of the load has moved from the first radio to the second radio, the method 500 proceeds to block 525 where the method 500 ends.

While FIG. 5 illustrates iteratively increasing the power level, in another embodiment, the control logic may estimate the power level required to reach the desired subset and transmit only one CSA using the second radio. In this embodiment, the control logic may have accurate client information such as the location of the client devices relative to the radios or the path loss between the radios and the client devices. The control logic can use the following equation to estimate the transmitter power for the CSA:

$$TxP=\max(\text{client\_sensitivity}-\text{client\_path\_loss})+\text{offset} \quad (1)$$

In equation 1, the maximum (max) is determined from among all the target clients and the client_path_loss includes all the loss elements between the destination radio and the client radios. The offset value accounts for noise and interference levels on the channel are sensed at the AP containing the first radio. The transmit power (TxP) provided by Equation 1 can then be used by the second radio to transmit the CSA only once in order to move the desired subset of client devices from the first radio to the second radio. Alternatively, the transmit power can also be used to determine the initial power for the CSA at block 510. The iterative loop shown in method 500 can then be used until the desired subset of client devices has moved. Put differently, using Equation 1 can provide a good estimate of the initial power needed which can then be iteratively increased until block 515 is satisfied thereby potentially saving time when compared to using a predetermined (i.e., static) initial power level at block 510.

Figure 6:
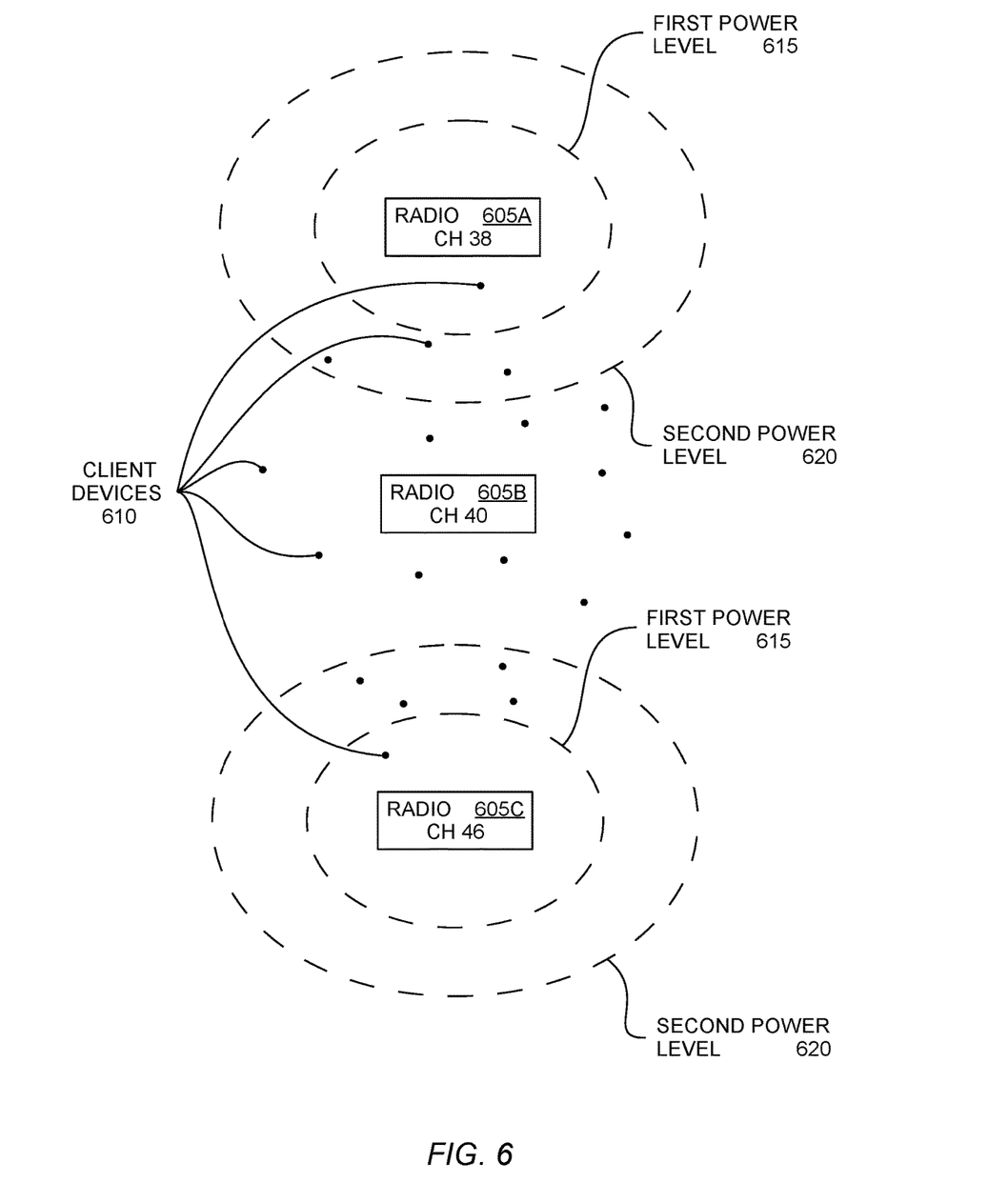
FIG. 6 illustrates iteratively increasing a power level for a CSA when multicasting a CSA, according to an embodiment described herein.

FIG. 6 illustrates iteratively increasing a power level for a CSA when multicasting a CSA, according to an embodiment described herein. In one embodiment, FIG. 6 illustrates performing the method 500 shown in FIG. 5 using multiple radios. As shown, the system includes three radios 605 which are located on separate APs. Further, each of the radios 605 use a separate channel to communicate with client devices—i.e., the radio 605A uses Channel 38, the radio 605B uses Channel 40, and the radio 605C uses Channel 46.

For simplicity, FIG. 6 illustrates only client devices 610 that are currently serviced by the radio 605B. That is, the client devices 610 are currently using Channel 40 to communicate with the radio 605B. The radios 605A and 605C may currently be servicing other client devices (which are not shown) using their respective channels.

To move a subset of the client devices from the radio 605B to the radios 605A and 605C, both the radios 605A and 605C transmit CSAs either at the same time or at different times using a first power level 615. That is, the radios 605A and 605C switch to Channel 40 used by the radio 605B and transmit respective CSAs that advertise their own channels—i.e., Channels 38 and 46. FIG. 6 includes respective dotted circles indicating the reach of the CSAs transmitted by the radios 605A and 605C. In this example, the CSAs transmitted at the first power level 615 by the radios 605A and 605C each reaches only one of the client devices 610. In response, one of the client devices 610 switches to Channel 38 used by the radio 605A and one of the client devices 610 switches to Channel 46 used by the radio 605C.

In this example, switching just two of the client device 610 from the radio 605B does not achieve the desired load balancing. In response, the control logic in the central controller instructs the radios 605A and 605C to transmit additional CSAs using a second, increased power level 620. Again, FIG. 6 includes respective dotted circles indicating the range of the CSAs transmitted using the second power level 620. The CSA transmitted by the radio 605A on Channel 40 reaches an additional three of the client devices 610 while the CSA transmitted by the radio 605C reaches an additional four of the client devices 610 relative to the CSAs transmitted at the first power level 615. As a result three more of the client devices 610 join Channel 38 while four more of the client devices 610 join Channel 46. If the desired subset of client devices has been moved from Channel 40, the radios 605A and 605C no longer send out additional CSAs.

Although FIG. 6 illustrates using the method 500 to move a subset of the client devices from the radio 605B, the method 500 could be used to move all the clients from the radio 605B if, e.g., the radio 605B has failed. In this example, the radios 605A and 605C can continue to increase the power level used to transmit the CSAs until the combined coverage area of the CSAs includes the entire coverage area of the radio 605B. The advantage of iteratively incrementing the power level of the CSAs rather than initially transmitting the CSAs at full power is that the client devices on Channel 40 may be better apportioned between the radios 605A and 605C. Moreover, although FIG. 6 illustrates dividing the client device 610 among two radios, a similar process can be followed to divide the client devices between three, four, or any number of radios which have coverage areas that at least partially overlap the coverage area of radio 605B.

Instead of changing the power level for the CSAs transmitted by the radios 605A and 605C in lock step as shown in FIG. 6, in another embodiment, the power levels of the radios 605A and 605C may change differently during the iterations based on a priority assigned to the radios 605A and 605C. For example, the radio 605A may currently have a smaller load than radio 605C, and thus, can handle more of the load from radio 605B. As such, the control logic may assign the radio 605A a higher priority than the radio 605C. In response, the control logic may increase the power level used by the radio 605A to transmit a CSA during each iteration more than the power level used by the radio 605C. For instance, the range of the CSA transmitted by the radio 605A may be larger than the range of the CSA transmitted by the radio 605. Thus, the CSAs transmitted by the radio 605A may reach an additional three client devices currently serviced by radio 605B which shifts more of its load to the radio 605A. In this manner, the control logic can prioritize the destination radios being used to load balance so that a greater (or lesser) amount of the load can be routed to a particular radio or radios.

Figure 7:
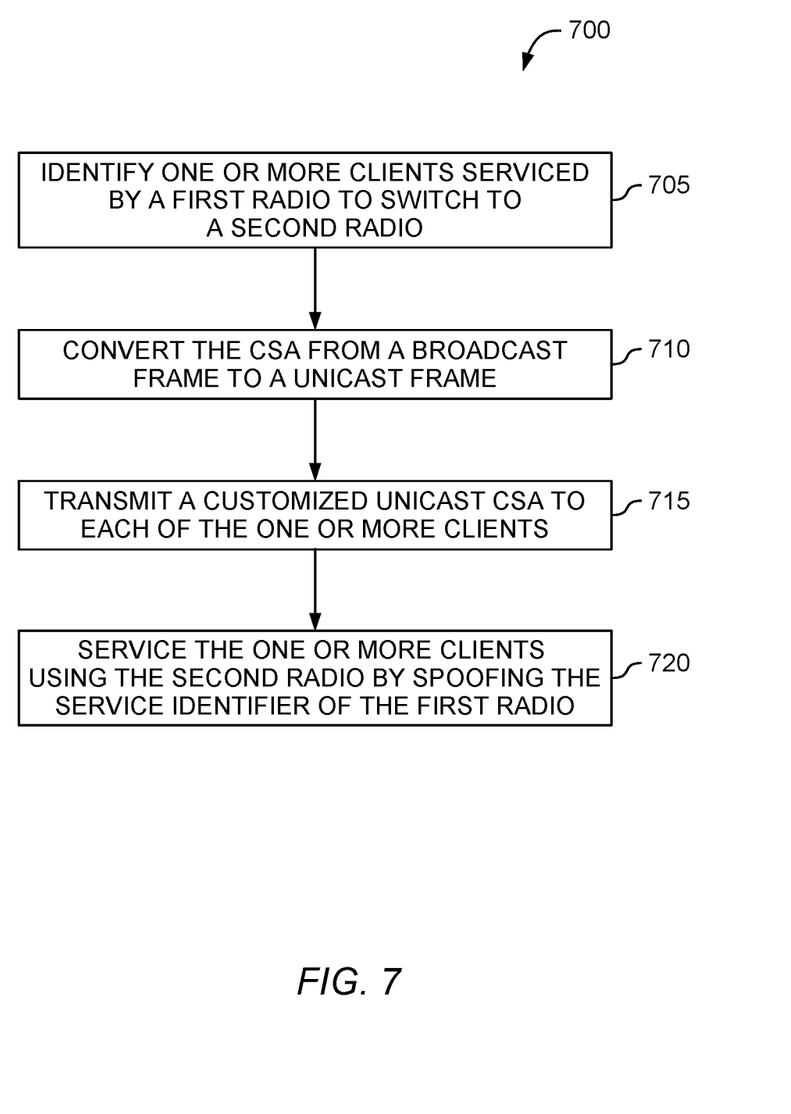
FIG. 7 is a flowchart for transmitting a unicast CSA to switch a client device between radios, according to an embodiment described herein.

FIG. 7 is a flowchart of a method 700 for transmitting a unicast CSA to switch a client between radios, according to an embodiment described herein. Generally, a CSA as defined in IEEE 802.11 is a broadcast communication which is not directed to any particular client or network device. Unlike in the methods above where the CSA are received by any client device within range and associated with the same BSSID, here, the CSA is intended for a particular client device. Stated differently, the CSA is converted from a broadcast frame into a unicast frame that is intended for a particular target client device.

At block 705, the control logic in the control system or in the central controller identifies one or more clients serviced by a first radio to switch to a second radio. In this embodiment, the control logic identifies specific client devices using a unique identifier such as the MAC address for the client devices. The control logic may select the specific client devices to achieve a desired load balance between the first and second radios. For example, if the control logic wants to move 50% of the load on the first radio to the second radio, the control logic may identify a list of client devices that causes 50% of the network traffic flowing through the first radio. Identifying specific client devices rather than transmitting a multi-cast CSA as described in FIG. 4 may be preferred since only a few client devices (e.g., less than half) may cause the majority of the traffic flowing through the first radio. By identifying and moving only these few client devices (rather than using generic broadcast CSAs), the control logic can achieve the desired load balancing.

At block 710, the control logic converts the CSA from a broadcast frame to a unicast frame. To do so, the return address (RA) of the CSA is changed to a client MAC address rather than a broadcast MAC as defined in the IEEE 802.11 standards. In this way, the control logic can steer specific client devices to another channel. That is, although multiple client devices may receive the unicast CSA, only the client device with the corresponding MAC address in the RA of the CSA will actually change channels.

At block 715, a respective customized unicast CSA is transmitted to each of the one or more client devices identified at block 705. The unicast CSA can be transmitted by either the first radio or the second radio. If transmitted by the second radio (which is presumably on a different channel than the first radio), the second radio switches to the channel of the first radio to transmit the CSA and then switches back to its channel as described above. However, the first radio does not need to switch channels to transmit the respective unicast CSAs to the one or more identified client devices.

At block 720, the second radio services the one or more client devices by spoofing the service identifier of the first radio (e.g., the BSSID of the first radio). As described above, the second radio may periodically advertise both its BSSID as well as the BSSID of the first radio so that the one or more client devices will use the second radio to access a network (e.g., the internal or wide area network).

Method 700 may be used in a variety of different scenarios. For example, the control logic can identify specific client devices to move between neighboring radios to perform load balancing. Moreover, the control logic may identify the client devices that are closest to the second radio and use respective unicast CSAs to move only those client devices from the first radio to the second radio. Also, if the control logic includes a complete list of the client devices serviced by the first radio, before the first radio is turned off as part of an upgrade, the first radio can send each of the client devices a customized unicast CSA to move the client devices to desired radios. That is, the control logic can divide the client devices amongst a plurality of destination radios and use the unicast CSAs to ensure the client device move to the respective destination radio. In this manner, the control logic can precisely dictate which radio the client devices move to as well as designating a plurality a destination radios (rather than a single radio).

In the embodiments above, the control logic may also transmit necessary encryption information between the first radio and the second radio (or radios). For example, if the first and second radios are on separate APs, the central controller can move any encryption keys used for communicating between the client devices and the first radio to the AP hosting the second radio so that those same encryption keys can be used when the client devices moves to the second radio. This results in a more seamless transfer. For example, if the client device is streaming a video when moving between the first and second radio, the stream would not be interpreted (assuming a small amount of buffering).

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction(s) execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction(s) execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instruction(s)s may also be loaded onto a computer, other programmable data processing apparatus, or other devices to cause a series of operational blocks to be performed on the computer, other programmable apparatus or other devices to produce a computer implemented process such that the instruction(s)s which execute on the computer or other programmable apparatus provide processes for implementing the functions/acts specified in the flowchart and/or block diagram block or blocks.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

What is claimed is:
1. A communication system comprising:
a first radio configured to service a first plurality of client devices using a first channel;

a second radio configured to service a second plurality of client devices using a second channel; and control logic configured to control the first and second radios, wherein the control logic is configured to:
determine a subset of a load corresponding to the first radio to transfer to the second radio;
instruct one of the first radio and the second radio to transmit a channel switch announcement (CSA) to at least a first client device of the first plurality of client devices using the first channel, wherein the CSA comprises instructions to switch from the first channel to the second channel, wherein the one of the first radio and the second radio transmits the CSA using a reduced power level less than a full power level; and
instruct the second radio to spoof a first service identifier corresponding to the first radio such that the first client device switches to the second channel and is serviced by the second radio, and wherein, in parallel to spoofing the first service identifier, the second radio advertises a second service identifier corresponding to the second radio, the second service identifier is used to establish communication between the second plurality of client devices and the second radio.

2. The communication system of claim 1, wherein the second radio transmits the CSA, and wherein instructing the second radio to transmit the CSA comprises:
switching the second radio from the second channel to the first channel;
after switching to the first channel, transmitting the CSA from the second radio on the first channel while spoofing the first radio; and
after transmitting the CSA, switching the second radio from the first channel to the second channel, wherein the second radio advertises the first and second service identifiers after transmitting the CSA and switching to the second channel.

3. The communication system of claim 2, wherein the control logic is configured to instruct the second radio to transmit the CSA after determining that the first radio has failed.

4. The communication system of claim 1, wherein the control logic is configured to:
after the second radio transmits the CSA using the reduced power level, determine that the subset of the load of the first radio has not been transferred to the second radio;
instruct the second radio to transmit a first CSA at an increased power level greater than the reduced power level; and
determine whether the subset of the load of the first radio has been transferred to the second radio in response to the first CSA.

5. The communication system of claim 4, wherein the increased power level is determined based on a network load on the second radio, wherein a third radio transmits a second CSA at the same time the second radio transmits the first CSA, wherein a power level for the second CSA is based on a network load on the third radio, and wherein the power level of the second CSA is different from the power level of the first CSA.

6. The communication system of claim 1, wherein the control logic is configured to:
determine the reduced power level based on a location or RF information about the client devices and the first radio.

7. The communication system of claim 1, wherein the CSA is a unicast CSA comprising a unique identifier of the first client device.

8. The communication system of claim 7, wherein the unique identifier is a MAC address of the first client device, and wherein the unique identifier is stored as a return address of the unicast CSA.

9. A communication system comprising:
a first radio configured to service a first plurality of client devices using a first channel;
a second radio configured to service a second plurality of client devices using a second channel; and
control logic configured to control the first and second radios, wherein the control logic is configured to:
instruct one of the first radio and the second radio to transmit a channel switch announcement (CSA) to at least a first client device of the first plurality of client devices using the first channel, wherein the CSA comprises instructions to switch from the first channel to the second channel;
instruct the second radio to spoof a first service identifier corresponding to the first radio such that the first client device switches to the second channel and is serviced by the second radio, and wherein, in parallel to spoofing the first service identifier, the second radio advertises a second service identifier corresponding to the second radio, the second service identifier is used to establish communication between the second plurality of client devices and the second radio;
instruct the first radio to perform a Channel Availability Check (CAC) on a third channel using Dynamic Frequency Selection (DFS) after the CSA has been transmitted, wherein the CSA instructs all of the first plurality of client devices to switch to the second channel serviced by the second radio; and
upon determining the CAC has been successfully performed, instruct at least one of the first radio and the second radio to transmit a different CSA instructing all of the first plurality of client devices to switch from the second channel to the third channel.

10. The communication system of claim 1, wherein the first radio, the second radio, and the control logic are disposed in a same network device.

11. The communication system of claim 1, wherein the first radio is disposed in a first network device and the second radio is disposed in a second network device separate from the first network device.

12. A computing system for controlling a first radio using a first channel to communicate with a first plurality of client devices and a second radio using a second channel to communicate with a second plurality of client devices, the computing system comprising:
a processor; and
memory configured to store a program that performs an operation for controlling the first and second radios, the operation comprising:
instructing one of the first radio and the second radio to transmit a CSA to at least a first client device of the first plurality of client devices using the first channel, wherein the CSA comprises instructions to switch from the first channel to the second channel, wherein the CSA is a unicast CSA comprising a unique identifier of the first client device; and
instructing the second radio to spoof a first service identifier corresponding to the first radio such that the first client device switches to the second channel and is serviced by the second radio, and wherein, in parallel to spoofing the first service identifier, the second radio advertises a second service identifier corresponding to the second radio, the second service identifier is used to establish communication between the second plurality of client devices and the second radio.

13. The computing system of claim 12, wherein the second radio transmits the CSA, and wherein instructing the second radio to transmit the CSA comprises:

switching the second radio from the second channel to the first channel;

after switching to the first channel, transmitting the CSA from the second radio on the first channel while spoofing the first radio; and after transmitting the CSA, switching the second radio from the first channel to the second channel, wherein the second radio advertises the first and second service identifiers after transmitting the CSA and switching to the second channel.

14. The computing system of claim 12, wherein the operation comprises:

determining a subset of a load corresponding to the first radio to transfer to the second radio, and wherein the second radio transmits the CSA using a reduced power level less than a full power level.

15. The computing system of claim 14, wherein the operation comprises:

after the second radio transmits the CSA using the reduced power level, determining that the subset of the load of the first radio has not been transferred to the second radio;

instructing the second radio to transmit a different CSA at an increased power level greater than the reduced power level; and determining whether the subset of the load of the first radio has been transferred to the second radio in response to the different CSA.

16. The computing system of claim 12, wherein the unique identifier is a MAC address of the first client device, and wherein the unique identifier is stored as a return address of the unicast CSA.

17. A method of controlling a first radio using a first channel to communicate with a first plurality of client devices and a second radio using a second channel to communicate with a second plurality of client devices, the method comprising:

instructing the second radio to transmit a CSA to at least a first client device of the first plurality of client devices using the first channel, wherein the CSA comprises instructions to switch from the first channel to the second channel, wherein instructing the second radio to transmit the CSA comprises:

switching the second radio from the second channel to the first channel, after switching to the first channel, transmitting the CSA from the second radio on the first channel while spoofing the first radio, and after transmitting the CSA, switching the second radio from the first channel to the second channel, wherein the second radio advertises first and second service identifiers after transmitting the CSA and switching to the second channel; and instructing the second radio to spoof the first service identifier corresponding to the first radio such that the first client device switches to the second channel and is serviced by the second radio, and wherein, in parallel to spoofing the first service identifier, the second radio advertises the second service identifier corresponding to the second radio, the second service identifier is used to establish communication between the second plurality of client devices and the second radio.

\* \* \* \* \*